Dec. 15, 1959 J. L. JENSEN 2,917,714
PLURAL PHASE OSCILLATOR
Filed Dec. 23, 1957
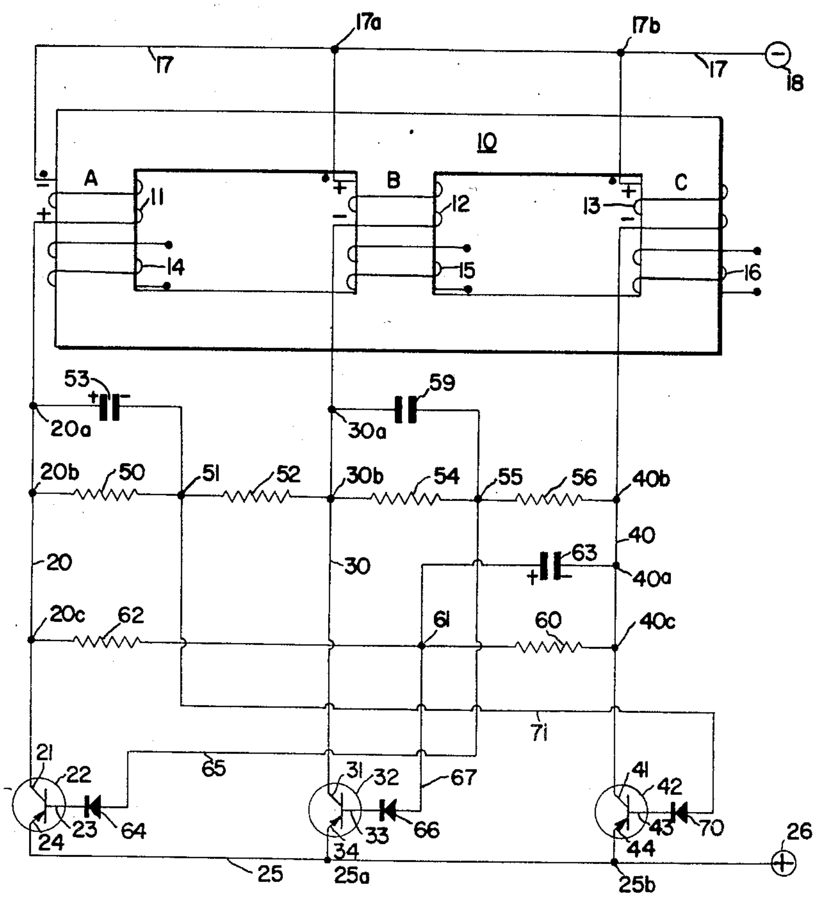
INVENTOR.
JAMES LEE JENSEN
BY Omund R. Dahle
ATTORNEY United States Patent Office 2,917,714

Patented Dec. 15, 1959

2,917,714

PLURAL PHASE OSCILLATOR

James Lee Jensen, St. Louis Park, Minn., assignor to Minneapolis-Honeywell Regulator Company, Minneapolis, Minn., a corporation of Delaware Application December 23, 1957, Serial No. 704,776

3 Claims. (Cl. 331—45)

This apparatus relates to a transistor circuit for generating three phase alternating current from a direct current potential source. More specifically, this invention relates to three phase inductively coupled transistor oscillator circuit apparatus for converting a D.C. potential source to three phase alternating current power.

An object of this invention is to provide semi-conductor circuit apparatus for converting direct current power to three phase alternating current power.

A further object of this invention is to provide a three phase transistor oscillator circuit which is inductively coupled to produce three phase alternating power from a direct current source.

These and other objects of the present invention will become more apparent from a further consideration of the specification, claims and drawing of which:

The single figure of the drawing is a diagrammatic representation of a preferred embodiment of the invention.

Referring now to the drawing there is disclosed a three phase transformer 10, which three phase transformer has core legs A, B, and C. Core legs A, B, and C have primary windings 11, 12, and 13, and secondary windings 14, 15, and 16, respectively, inductively associated therewith. The beginning of each of the primary windings 11, 12 and 13 are indicated by a black dot on the drawing, and each of the primary windings has its beginning terminal connected to a negative supply conductor 17.

The ending terminal of the primary winding 11 is connected by a conductor 20 to a collector electrode 21 of a transistor 22. The transistor 22 as disclosed, is of the junction PNP type and also includes a base electrode 23 and an emitter electrode 24. The emitter electrode is directly connected to a positive conductor 25 which terminates at positive potential source terminal 26.

The end terminal of primary winding 12 is connected by a conductor 30 to a collector electrode 31 of a transistor 32. The transistor 32 may be of the same type as transistor 22, and also includes a base electrode 33 and an emitter electrode 34. The emitter electrode 34 is directly connected to the positive source conductor 25 at a junction 25*a*. The end terminal of primary winding 13 is connected by means of a conductor 40 to a collector electrode 41 of a transistor 42. Transistor 42 may be of the same type as transistors 22 and 32, and also include a base electrode 43 and an emitter electrode 44. The emitter electrode 44 is directly connected to the positive supply conductor 25 at a junction 25*b*.

The end terminal of each of the primary windings 11, 12 and 13 is connected to each of the other end terminals by an impedance network. One such network can be traced from a junction 20*b* on the conductor 20 through a resistor 50, a junction 51, and a resistor 52 to a junction 30*b* on the conductor 30. A capacitor 53 is connected from a junction 20*a* on the conductor 20 to the junction 51 between the two resistors, and thus is in parallel with the resistor 50. A second impedance network can be traced from the junction 30*b* on the conductor 30 through a resistor 54, a junction 55, and a resistor 56 to a junction 40*b* on the conductor 40. A capacitor 57 is connected from a junction 30*a* on the conductor 30 to the junction 55 between the two resistors, thus connecting capacitor 57 in a parallel relation with resistor 54. A third resistive network path can be traced from a junction 40*c* on the conductor 40 through a resistor 60, a junction 61, and a resistor 62 to a junction 20*c* on the conductor 20. A capacitor 63 is connected from a junction 40*a* on the conductor 40 to the junction 61 and thus is connected in parallel with the resistor 60. Thus an impedance network has been established between each of the end terminals of the transformer primary winding and also between each of the collector electrodes of the transistors 22, 32, and 42.

The base electrodes 23, 33, and 43 are connected to intermediate points of the impedance networks. Thus, the base electrode 23 is connected through a non-linear impedance element 64, here shown as a Zener diode, and a conductor 65 to the junction 55. The element 64 may also function as a voltage reference means. A base electrode 33 of transistor 32 is connected to the junction 61 by means of a circuit path which includes a non-linear impedance element 66, shown as a Zener diode, and a conductor 67. Similarly, base electrode 43 of transistor 42 is connected through a non-linear impedance element 70, shown as a Zener diode, and a conductor 71 to the junction 51.

*Operation*

In considering the operation of the three phase generator of the present invention it should be noted that core 10 is intended to represent a three phase transformer core having separate core legs A, B, and C. Flux induced in one of the core legs flows through the other two core legs. The transistors are conductive one at a time, in rotation, when one transistor is conducting the other two are cut off. Let it be assumed that the three phase generator is operating normally and that transistor 22 has just become fully conductive. A current path may then be traced from the positive potential source 26 through conductor 25, through transistor 22 from the emitter 24 to collector 21, through conductor 20, primary winding 11 of transformer 10, and through conductor 17 to the negative source terminal 18. The base current path for transistor 22 which maintains the transistor conductive will be described in more detail below. The current flowing through the primary winding 11, above described, results in a voltage appearing across the winding such that the beginning terminal of a winding is negative with respect to the end terminal, as is shown in the drawing. This current flowing through the winding also induces a flux in the core leg A, the induced flux flowing upwardly through the core leg A, dividing and flowing downwardly through core legs B and C. The induced flux flowing in core legs B and C will result in potentials appearing across primary windings 12 and 13 in which the beginning of the windings are positive with respect to the ending of the windings. These induced potentials make the voltage on conductors 30 and 40 negative with respect to the negative supply conductor 18. The negative potential on these conductors 30 and 40 is applied through the resistors 54 and 56 the conductor 65 and the Zener diode 64 to the base electrode 23 of transistor 22, this negative potential being large enough to exceed the breakdown point of the diode 64 so that current flows out of the base electrode 23 and through the Zener diode 64.

The operation continues in this mode until the core A saturates. Up to this time the transistors 32 and 42 have been maintained cut off since there has not been in the base bias paths of these two transistors a sufficiently negative potential to exceed the Zener points of the diodes 66 and 70. Consider, for example, the bias path to transistor 32. It will be noted that while the resistor 60 is connected to a large negative potential at terminal 40c, the resistor 62 is connected to a potential which approaches the potential of the positive supply terminal 26, since the transistor 22 is conductive and represents a low impedance. The potentials are summed by the resistors 62 and 60 but do not provide a sufficiently negative potential to reach the Zener breakdown point of the Zener diode 66. An identical situation can be traced for the transistor 42 by considering the potential levels at the terminals of resistors 50 and 52 whereupon it will be readily understood that transistor 42 also cannot be conductive during the period when transistor 22 is conductive. In considering further the impedance network including resistors 50 and 52, during the period when transistor 22 is conductive, it will be appreciated that the conductor 20 is at a more positive potential than is conductor 30 and therefore a substantial potential drop will appear across resistor 50 and the parallel capacitor 53.

As the core leg A saturates and the voltage across primary winding 11 diminishes, the voltage on conductor 20 flows in a more negative direction and the voltage charge across the capacitor 53 drives the junction 51 sufficiently negative so that the Zener point of diode 70 is exceeded whereupon base current begins to flow in transistor 42 and the transistor is rendered conductive. Immediately upon transistor 42 becoming conductive the potential on conductor 40 is changed in a positive going direction, the potential on conductor 40 approaching that of the positive supply conductor 26. At the same time, the bias to the previously conducting transistor 22 is changed because the resistor 56 of the bias network is now connected to a relatively positive potential on conductor 40 where it previously was at a relatively negative potential. The potential now appearing across the Zener diode is less than the breakdown potential, the diode does not conduct current, and the transistor 22 is maintained cut off. It will also be noted that at this time transistor 32 remains cut off. The resistor 62, one of the bias resistors for transistor 32, which previously was connected to a positive potential at junction 20c when transistor 22 was conductive, is now connected to a negative potential. At the same time, however, bias resistor 60 which was previously connected to the negative potential which appeared on conductor 40 is now connected to a positive potential with transistor 42 being conductive. Prior to the switching action, the capacitor 63 was charged such that junction 61 was positive with respect to junction 40a, and this capacitor potential charge prevented the potential at junction 61 from becoming sufficiently negative during the switching cycle so that the Zener point of diode 66 would be exceeded.

With transistor 42 conductive a current path can be traced from the positive supply terminal 26, through conductor 25 to junction 25b, through the transistor 42 from emitter 44 to collector 41, through the conductor 40 and the primary winding 15, and through the conductor 17 to the negative supply terminal 18. The induced flux in the core leg C is now in an upwardly direction and this induced flux flows downwardly through core legs A and B during this period of time or mode of operation, the charge on capacitor 53 substantially disappears, the potential on capacitor 63 reverses in polarity, and capacitor 57 which previously had substantially no charge now charges so that junction 55 is positive with respect to junction 30a.

This mode of operation continues until core leg C reaches saturation. Whereupon the potential across winding 13 diminishes and the potential on the conductor 40 flows in a negative direction. The charge on capacitor 63, which is now of a polarity reversed from that shown, that is, the potential at junction 61 is now negative with respect to the junction 40a, so that as the potential on conductor 40 moves in a negative going direction the charge on capacitor 63 is effective to drive junction 61 sufficiently negative to reach the breakdown point of the Zener diode 66. With the Zener breakdown of diode 66 reached, the transistor 32 becomes conductive and a current path can be traced from the positive supply terminal 26 through conductor 25, junction 25a, through the transistor 32, conductor 30, primary winding 12, and conductor 17 to the negative supply terminal 18. With transistor 32 becoming conductive, the potential on conductor 30 moves in a positive going direction so that the potential on conductor 30 approaches that of the positive supply terminal 26. The changing voltage on conductor 30 is reflected to the bias network for the transistor 42 by means of the resistor 52, the voltage across the Zener diode 70 being less than the breakdown point so that the transistor 42 is maintained cut off. At the same time, the potential charge across capacitor 57 is effective to maintain the transistor 22 in a state of non-conduction during this portion of the cycle. During this mode of operation, the charge on capacitor 63 diminishes, the charge on capacitor 57 reverses in polarity so that the junction 30a is positive with respect to the junction 55, and capacitor 53 becomes charged in a polarity opposite from that shown in the drawing so that junction 51 is positive with respect to 20a. The current flowing through the primary winding 12 induces a flux in the core leg B in an upwardly direction which divides and flows downwardly through core legs A and C. When this mode of operation has continued until core leg B reaches saturation, transistor 22 again becomes conductive and the cycle has been completed. The secondary windings 14, 15 and 16 may be tuned by capacitors if desired and are connected to a suitable three-phase power utilizing means.

Many changes and modifications of this invention will undoubtedly occur to those who are skilled in the art, and I therefore wish it to be understood that I intend to be limited by the scope of the appended claims and not by the specific embodiment of my invention which is disclosed herein but for the purpose fo illustration only.

I claim:

1. Semiconductor oscillator apparatus for generating three phase alternating power from a direct current source comprising: first and second power input terminals adapted to be connected to a source of direct current potential; three phase transformer means; said transformer means comprising a magnetic core having at least three saturable leg portions, and having three phase output connections and at least one winding wound on each of said leg portions; means connecting the first terminal of each of said windings to the first power input terminal; first, second and third normally non-conductive semiconductor switching means, each of said semiconductor switching means having a plurality of electrodes including first and second switching electrodes and a control electrode and being operable to a conductive condition upon a proper switching potential being applied to said control electrode, said first switching electrodes being connected to the second power input terminal; means directly connecting the second switching electrodes of said first, second and third semiconductor switching means, respectively, to the second terminals of said windings whereby the conductivity in turn of the several semiconductor switching means controls current flow through the respective windings; first resistor means connected between the second switching electrodes of said second and third semiconductor switching means, second resistor means connected between the second switching electrodes of said third and first semiconductor switching means, third resistance means connected between the second switching electrodes of said first and second semiconductor switching means, each of said resistor means having an intermediate tap; first, second and third Zener reference diode means connected, respectively, between the control electrodes of said first, second and third semiconductor switching means and the intermediate tap of said first, second and third resistors; and switching sequence controlling capacitor means connected between the second switching electrode of said first semiconductor switching means and the third Zener diode means, the potentials induced in said transformer windings being effective through said Zener diode and said resistor means to render said semiconductor switching means conductive one at a time, in sequence, the switching potentials being generated due to saturation of one of said core leg portions, the proper sequence being initiated and maintained by said sequence controlling capacitor means.

2. Semiconductor oscillator apparatus for generating three phase alternating power from a direct current source comprising: first, second and third semiconductor devices, each having a plurality of electrodes including collector and emitter electrodes and a control electrode; first and second power source terminals adapted to be energized from a source of direct current potential, the emitter electrode of each of said devices being connected to said first source terminal; three phase transformer means, said three phase transformer means comprising a three legged magnetic saturable core having at least an input and an output winding on each of said legs; means directly connecting the first terminal of said input windings to the second power source terminal; means directly connecting the second terminals of said input windings, respectively, to the collector electrodes of said first, second and third semiconductor devices; first, second and third reference voltage means, said means having one terminal connected, respectively, to the control electrodes of said semiconductor devices; first resistor means connected to said first reference voltage means connecting the control electrode of said first semiconductor device to the second power source terminal by way of the input windings of said second and third leg; second resistor means connected to said second reference voltage means connecting the control electrode of said second semiconductor device to the second power source terminal by way of the input windings of said third and first legs; third resistor means connected to said third reference voltage means connecting the control electrode of said third semiconductor device to the second power source terminal by way of the input windings of said first and second legs; and switching sequence determining capacitor means connected from the collector electrode of each of said semiconductor devices to the control circuit of another of said semiconductor devices.

3. Three phase inductively coupled oscillator apparatus for generating three phase alternating power from a direct current potential comprising: three phase transformer means said means including a saturable magnetic core having first, second and third core legs, said core being arranged so that magnetic flux induced in one of said legs divides and flows through the other two of said legs; a primary winding on each of said legs linking the core in inductive relation thereto; a source of unidirectional potential; first, second, and third normally nonconductive electroresponsive devices each having at least three electrodes; said first, second and third primary windings being connected for energization from said unidirectional source through separate paths, each of said paths including a pair of electrodes of one of said electroresponsive devices, each of said devices having a substantially non-conducting condition between said pair of electrodes and being operable to a conducting condition between said electrodes, each of said devices being operable from one to the other of said conditions upon a suitable biasing potential being applied to the third electrode; first, second and third Zener diodes connected to the third electrodes of said electroresponsive devices for preventing current flow in said third electrode circuits until the magnitude of the control signal applied reaches the Zener point of the diode; resistor means connecting each of the Zener diodes to said three phase transformer means windings; and switching sequence controlling capacitor means connected from the first path to the third electrode of the electroresponsive device in said third path, the induced voltages on said transformer means maintaining said electroresponsive devices conductive one at a time, in sequence, switching from one to another of said electroresponsive devices occurring upon saturation occurring in a portion of said magnetic core, the proper sequence being initialed and maintained by said capacitor means.

References Cited in the file of this patent

UNITED STATES PATENTS

| | | |
|---|---|---|
| 2,655,609 | Shockley | Oct. 13, 1953 |
| 2,810,843 | Granqvist | Oct. 22, 1957 |

FOREIGN PATENTS

| | | |
|---|---|---|
| 1,007,818 | France | Feb. 13, 1952 |